(12) United States Patent
Schiek et al.

(10) Patent No.: US 9,650,058 B2
(45) Date of Patent: May 16, 2017

(54) AUTONOMOUS DRIVING SYSTEM FOR A VEHICLE AND METHOD FOR CARRYING OUT THE OPERATION

(71) Applicant: Robert Bosch GmbH, Stuttgart (DE)

(72) Inventors: Ulrich Schiek, Hannover (DE); Wolfgang Kopmann, Hildesheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 85 days.

(21) Appl. No.: 14/749,009

(22) Filed: Jun. 24, 2015

(65) Prior Publication Data

US 2015/0375757 A1    Dec. 31, 2015

(30) Foreign Application Priority Data

Jun. 30, 2014   (DE) .......................... 10 2014 212 596

(51) Int. Cl.
| | |
|---|---|
| *B60W 50/14* | (2012.01) |
| *B60K 35/00* | (2006.01) |
| *B60K 37/06* | (2006.01) |
| *B60W 50/00* | (2006.01) |

(52) U.S. Cl.
CPC ............. *B60W 50/14* (2013.01); *B60K 35/00* (2013.01); *B60K 37/06* (2013.01); *B60W 50/0097* (2013.01); *Y02T 10/84* (2013.01)

(58) Field of Classification Search
CPC .... G05D 1/0272; G05D 1/027; G05D 1/0278; G05D 2201/0216; G05D 1/0255
See application file for complete search history.

(56) References Cited

U.S. PATENT DOCUMENTS

| | | | | |
|---|---|---|---|---|
| 6,014,601 A | * | 1/2000 | Gustafson | B60Q 9/008 340/436 |
| 2006/0293856 A1 | * | 12/2006 | Foessel | B60W 30/09 701/301 |
| 2012/0283927 A1 | * | 11/2012 | Reinisch | B60T 7/22 701/70 |

* cited by examiner

*Primary Examiner* — Jelani Smith
(74) *Attorney, Agent, or Firm* — Gerard Messina

(57) ABSTRACT

An autonomous driving system for a vehicle includes: a computer unit which evaluates surroundings-related and vehicle-related data with the aid of sensors and carries out an automatic driving operation based on the data; a lead time calculator assigned to the computer unit and determining a lead time by evaluating the surroundings-related and vehicle-related data, the lead time requiring an intervention by the driver; and a comfort time calculator assigned to the computer unit and calculating a reaction time of the driver by evaluating driver-related data, the comfort time calculator continuously comparing the lead time with the reaction time and determining therefrom a comfort time which is determined by taking the difference between the lead time and the reaction time. When the comfort time reaches zero, a countermeasure including a prewarning of the driver and/or a mode change of the driving system is initiated.

10 Claims, 2 Drawing Sheets

AUTONOMOUS DRIVING SYSTEM FOR A VEHICLE AND METHOD FOR CARRYING OUT THE OPERATION

BACKGROUND OF THE INVENTION

1. Field of the Invention

The present invention relates to an autonomous driving system for a vehicle and a method for carrying out the operation, including a computer unit, which evaluates surroundings-related and vehicle-related data with the aid of sensors and carries out an autonomous driving operation based on the data.

2. Description of the Related Art

It is known to provide autonomous driving systems for vehicles, which observe the surroundings of the vehicle with the aid of sensors. These driving systems do not yet actively include the present state of the driver, making it necessary for the driver to maintain a more or less permanent visual contact with the road during autonomous driving operation.

BRIEF SUMMARY OF THE INVENTION

The autonomous driving system for a vehicle according to the present invention has the advantage over the related art that during autonomous driving operation, the driver may be granted a certain freedom, in particular no permanent visual contact with the road, while the safety is nonetheless additionally increased. In particular in the case of critical situations, the driver may be instructed in good time to take over control of the vehicle. If the driver is too severely distracted, countermeasures may be initiated very early, for example, bringing the vehicle into a safe condition by reducing speed, if necessary decelerating to an emergency stop. It is very advantageous that it is not necessary to warn the driver in certain situations, since the driving system according to the present invention has detected that the driver has recognized the danger in any case and reacted accordingly.

Another improvement of the safety of the autonomous driving system is obtained if, for calculating the comfort time, the difference is determined between lead time $t_V$ and a sum of reaction time $t_R$ and additionally a system reaction time $t_{SYS}$ and additionally a safety time $t_s$.

Another improvement of the safety of the autonomous driving system is obtained if reaction time $t_R$ is already reduced as a precaution, in that, in the event that the driving system has determined a long reaction time $t_R$, training messages directed to the driver must be confirmed and/or messages are sent by the driving system to the driver, which result in increased attention of the driver.

A driving system which is very comfortable for the driver is obtained if the comfort time calculator has two main operating modes which are predefinable by a user. The first operating mode may be designed to be user comfort-prioritizing, in that a fixed comfort time $t_k$ is predefined, which the user may enter directly into the driving system as a time specification and/or may also be preset by the user as a predetermined sub-mode setting and/or may also be ascertained automatically via a driver state detection. Alternatively, the second operating mode may be designed to be travel-prioritizing, in that the driver enters readiness for increased driver attention into the driving system when starting travel, and comfort time $t_k$ is set to a correspondingly low value and results in a setting of the driving system having a higher travel speed.

Another improvement of the safety of the autonomous driving system is obtained if the driving system after each warning carries out a calibration of reaction time $t_R$ calculated on the part of the driving system after each warning, in that reaction time $t_R$ calculated by the system is compared with a measured reaction time.

Advantageously, the driving system may provide a display of lead time $t_V$ for the user.

It is also advantageous to regulate the speed of the vehicle within established limits automatically, this occurring as a function of ascertained lead time $t_V$ and reaction time $t_R$ of the driver. It may also be included that there may be no interference with other road users.

DETAILED DESCRIPTION OF THE INVENTION

Figure 1:
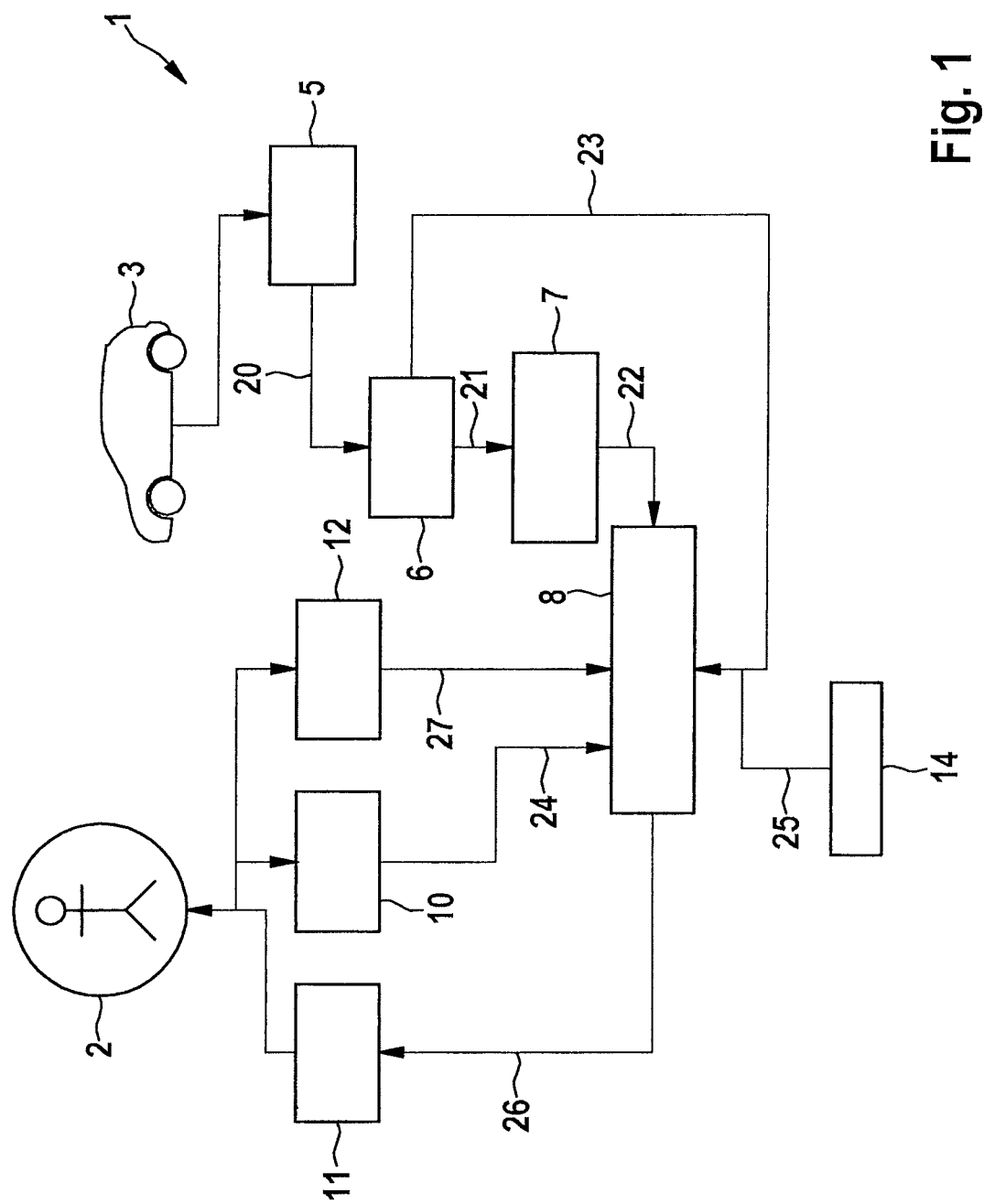
FIG. 1 shows the schematic structure of the autonomous driving system for a vehicle in a block diagram.

The schematic structure of autonomous driving system 1 according to the present invention for a vehicle is shown in a block diagram in FIG. 1. Autonomous driving system 1 is provided to at least temporarily relieve the driver of the responsibility for driving the vehicle.

Driving system 1 has a driver-side branch and a vehicle-side branch, the first being indicated by a driver icon 2 and the second being indicated by a vehicle icon 3.

In the vehicle-side branch, the vehicle surroundings are observed via sensors 5 and fed via a connection 20 to a computer unit 6, which ascertains therefrom status information of the vehicle, a sensor range and an obstacle distance, which is then fed via a connection 21 to a lead time calculator 7. Computer unit 6 thus masters all tasks of a previous autonomous system, which will be expanded according to the present invention to include lead time calculator 7 and a comfort time calculator 8. Autonomous driving system 1 observes its surroundings using sensors 5. From this, it ascertains a model of the surroundings using surroundings-related and vehicle-related data and determines necessary maneuvers of the vehicle. The period of time from the point in time at which the system recognizes the need for a maneuver, until the point in time at which the maneuver must be carried out, is described in the following as lead time $t_V$. Lead time $t_V$ describes the remaining residual time, in which autonomous driving system 1 still has the vehicle safely under control. Subsequently, an intervention by the driver is necessary. Lead time $t_V$ is affected by, among other things, the following influencing factors. The vehicle speed should be noted, since a higher speed reduces lead time $t_V$. Furthermore, the sensor range should be noted, since a smaller sensor range, such as during fog, reduces lead time $t_V$. Furthermore, depending on the design of autonomous driving system 1, such as a multiple target capability, a higher traffic density reduces the logical sensor range and accordingly the lead time as well. In addition, the sensor availability should be noted, since a failure of sensors may also reduce lead time $t_V$. Finally, obstacles should be noted, since detected obstacles, such as roadway narrowings, reduce lead time $t_V$ based on their distance. Lead time $t_V$ is calculated in lead time calculator 7 essentially based on vehicle-related and surroundings-related data and fed via a connection 22 to comfort time calculator 8. A time-based regulation query occurs in the form of an exchange between comfort time calculator 8 and computer unit 6 via a connection 23.

Other parameters for comfort time calculator 8 in the driver's side branch are reaction time $t_R$ and its general state of the driver, for which driver-related data are evaluated.

The period of time needed by the driver to recognize a dangerous situation and intervene in the autonomous driving is referred to as reaction time $t_R$. The length or duration of reaction time $t_R$ mainly depends on the degree of distraction of the driver and it may also be influenced by the attention and by the position or the location of the driver. Driving system 1 according to the present invention observes driver 2 via cameras and sensors in vehicle operating elements, which detect the driver's present operating procedures and thus ascertain driver-related data. To be mentioned by way of example are on the one hand the viewing direction, in particular the focal point of the eyes and the facial orientation. This is followed by the present location in the vehicle, which may be ascertained, for example, from the seat occupancy and/or the pedal contact and/or the steering wheel contact and/or the system operations. Furthermore, the use of mobile terminals may be included, such as media consumption, and also the making of phone calls, including from mobile radio devices as well as an estimate of the driver's state as to whether he is awake or tired, may be included.

In addition, of course, the already described traffic situation, as well as factors such as range of vision, rain (for example, windshield wipers streaking), etc. pp. also have an impact on the reaction time of the user, since complex situations are also more difficult for the user to detect or result in a longer reaction time.

Based on these data, driving system 1 then develops a model of the driver's state, preferably modeled in comfort time calculator 8 and derives from it the most likely reaction time $t_R$ based on the model or experience. This reaction time $t_R$ is the time needed for the driver to take over for or support autonomous driving system 1 and may also be referred to as alarm time. This determination of the driver's state is indicated in FIG. 1 under the block user monitor 10, which then outputs reaction time $t_R$ and the general state of the driver to comfort computer 8 via connection 24. User monitor 10 observes the user and continuously ascertains instantaneous reaction time $t_R$ and the present state of the driver. Furthermore, user monitor 10 displays data such as, for example, calculated lead time $t_v$.

According to the present invention, comfort time calculator 8 compares lead time $t_v$ with reaction time $t_R$. If the sum of reaction time $t_R$, advantageously in addition to a system reaction time $t_{SYS}$ and advantageously also in addition to a safety time $t_s$, is less than lead-time $t_v$, driving system 1 is in a comfort zone 15, in which comfort time $t_k$>0. If comfort time calculator 8 then detects that this is equal to zero, comfort time calculator 8 tries to initiate countermeasures in which it asks the driver for more attention and a prewarning is issued to the driver. Via a connection 26 of comfort time calculator 8, a warning level or the request for taking over operation of the vehicle is issued, which is indicated by the block user alarm 11. An alarm does not occur if the detected state of the driver already indicates that the driver already displays complete attention, so that $t_R = t_{Rmin}$ applies, which is the minimum value. Alternatively or in addition, the autonomous system characterized by computer unit 6 may be transitioned into a safe mode change, in that a control specification for lead time $t_v$ is predefined. This may then result, for example, in a reduction of the vehicle speed to a maximum speed of zero, which corresponds to an emergency stop. Driving system 1 therefore constantly compares reaction time $t_R$ or the alarm time of the driver with remaining lead time $t_v$ in order to instruct the driver to take over control of the vehicle in good time in a critical situation. If the driver is severely distracted and driving system 1 then estimates or calculates a high reaction time $t_R$ or alarm time, appropriate measures are already initiated at an early time, such as decelerating the vehicle to an emergency stop, if necessary, or otherwise bringing the vehicle to a safe state. Advantageously, a warning of the driver may be omitted in certain situations, if driving system 1 has detected that the driver has already recognized the danger and reacts accordingly. Another advantageous extension is to limit reaction time $t_R$ of the driver or intentionally reduce his alarm time, by requesting the driver to confirm training messages or increase his attention if reaction time $t_R$ is estimated to be too high. The speed of the vehicle may also be regulated automatically within established limits, which occurs as a function of specific lead time $t_v$. Hereby, it is considered that no other road users should be hampered by the increase in speed.

In addition, a mode selection initiated by the user may change the system behavior. The mode selection is indicated by the block mode input 12. The mode is transferred to comfort time calculator 8 via a connection 27. Comfort time calculator 8 has two main operating modes, a first main operating mode and a second main operating mode. The user may choose between these operating modes. The first main operating mode is oriented to a user comfort priority. The user may set a certain comfort time $t_k$ in the driving system. The conventional autonomous system characterized by computer unit 6 is then controlled in such a way that desired comfort time $t_k$ of the user may be maintained. This occurs via regulation of the vehicle speed and/or, if necessary, also via the route selection. To select the first main operating mode, the user may directly set the time of comfort time $t_k$ and/or select a sub-menu or carry out a sub-mode setting in the vehicle system. An indirect selection is also possible via an automatic detection of the present state of the driver. In this case, driving system 1 must be able to distinguish allowed states, such as reading, surfing, being entertained, from impermissible states, such as sleeping, getting up, etc.

The second main operating mode is oriented to a travel priority, i.e., a rather faster vehicle driving mode is provided and resulting comfort zone 15 is correspondingly smaller. However, the user must then give greater attention and completely stop peripheral activities. By making an input in the block mode input 12, the user is able to adjust the two main operating modes.

System reaction time $t_{SYS}$ is the time required for the autonomous system to carry out an autonomous driving maneuver based on a detected traffic situation. Taking the emergency stop as an example, this would be the system processing time plus the braking time and plus a safety reserve.

Safety time $t_s$ is the time reserve, which the system holds in reserve in order to compensate the error of the reaction time estimation or the determination of reaction time $t_R$.

The safety time reserve is transferred to comfort time calculator 8 via the block control parameter 14 via a connection 25.

Figure 2:
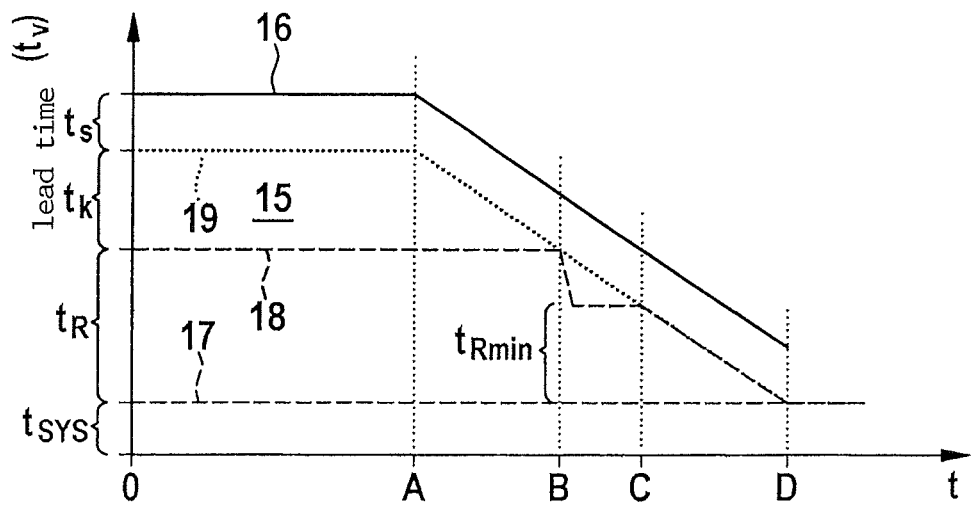
FIG. 2 shows a diagram of a first exemplary sequence of the control parameters according to a first configuration.

An exemplary sequence of the control parameters is shown below with reference to the diagrams according to FIG. 2 and FIG. 3. Elapsed action time t or the observation horizon is plotted in FIGS. 2 and 3 as the abscissa and lead time $t_v$ is plotted as the ordinate. Solid line 16 indicates the curve of precalculated lead time $t_v$. At point in time A, an obstacle emerges in the observation horizon of the system. When reaction time $t_R$ of the driver and safety time $t_s$ and system reaction time $t_{SYS}$ are subtracted from lead time $t_v$ calculated by the system, the result is a buffer which represents comfort zone 15. The curve of system reaction time $t_{SYS}$ is indicated by a dashed line 17. Added to this is reaction time $t_R$ of the driver, indicated by a dashed line 18. Safety time $t_s$ is indicated by a dashed line 19. Comfort zone 15 runs between line 18 and 19. No continuous direct visual contact with the road is necessary in comfort zone 15. Since the obstacle gets closer, with the present attention status of the driver with his reaction time $t_R$, at point in time B, comfort time $t_k$ becomes zero; the driver would thus leave comfort zone 15. According to the present invention, the user receives a prewarning at B to motivate him to increased attention, which then results in a minimum reaction time $t_{Rmin}$, so that some comfort time $t_k$ or comfort zone 15 remains again. At point in time C, driving system 1 detects that it can no longer keep the user in comfort zone 15 and initiates the transfer to the driver or the termination of autonomous operation. The autonomous operation is ended at point in time D.

Figure 3:
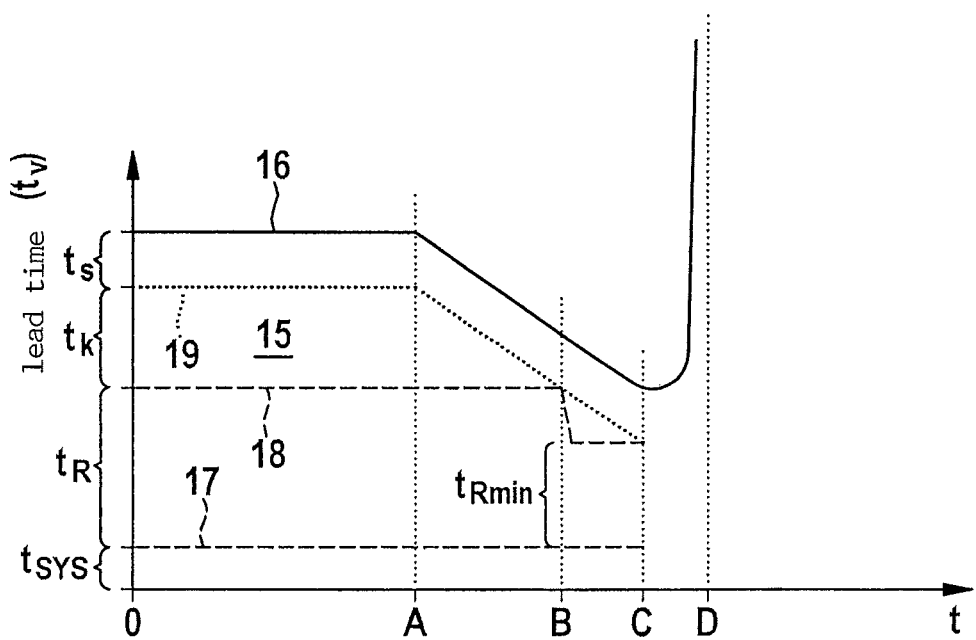
FIG. 3 shows a diagram of a second exemplary sequence of the control parameters according to a second configuration.

FIG. 3 shows an alternative system configuration in which an emergency maneuver, such as an emergency stop, is initiated directly at point in time C.

Furthermore, at the time of each warning, System 1 carries out a calibration of estimated reaction time $t_R$, which occurs by comparing the estimated reaction time or a reaction time $t_R$ calculated by the system with a measured reaction time. System 1 may also provide a display of lead time $t_v$ for the user, for example, on user monitor 10.

The autonomous driving system according to the present invention represents an advantageous supplementation of known autonomous driving systems.

What is claimed is:

1. An autonomous driving system for a vehicle, comprising:
    a sensor system; and
    a computer unit communicatively coupled to the sensor system, wherein the computer unit is configured to:
        evaluate surroundings-related and vehicle-related data acquired with the aid of sensors of the sensor system and carry out an autonomous driving operation based on the data;
        continuously perform the following:
            based on the surroundings-related and vehicle-related data, determine an amount of time, prior to a point in time by which an intervention by the driver to interrupt the autonomous driving operation would be required due to a possible future event, by which the autonomous driving system is expected to be able to recognize that the intervention would be required, the determined amount of time being a lead time;
            based on driver-related data obtained via the sensor system, determine an amount of reaction time the driver is expected to take to perform the intervention in response to a signal from the autonomous driving operation; and
            compare a first time value that is based on the lead time to a second time value that is based on the reaction time; and
        respond to a result of the comparison being that the second time value is too great relative to the first time value by, prior to the recognition that the intervention by the driver would be required, initiating a countermeasure that includes at least one of:
            prewarning the driver to increase attentiveness in order to reduce the reaction time; and
            increasing the lead time by one of (a) changing a mode of the driving system and (b) reducing the vehicle speed.

2. The autonomous driving system as recited in claim 1, wherein the first time value is the lead time and the second time value is a sum of (i) the reaction time, (ii) a system reaction time to the possible future event, and (iii) a safety time.

3. The autonomous driving system as recited claim 2, wherein the computer unit is configured to be set to two main operating modes which are predefinable by a user, and the computer unit is configured to differently respond to the result of the comparison being that the second time value is too great relative to the first time value depending on to which of the two modes the computer unit is set.

4. The autonomous driving system as recited in claim 3, wherein the first main operating mode is a user comfort-prioritizing mode in which a fixed comfort time is defined at least one of (i) by the user and entered into the driving system as a time specification, (ii) by the user as a predetermined sub-mode setting, and (iii) automatically via detection of a driver's state, and wherein the comfort time defines an amount of by which the first time value must be greater than the second time value.

5. The autonomous driving system as recited in claim 4, wherein the second main operating mode is a travel-prioritizing mode in which the driver enters readiness for increased driver attention into the driving system when starting travel, and the comfort time is set to a correspondingly low value and results in a setting of the driving system having a higher travel speed.

6. The autonomous driving system as recited in claim 3, further comprising:
    a display unit for displaying the lead time to the user.

7. The autonomous driving system as recited in claim 3, wherein the speed of the vehicle is automatically regulated within predefined limits as a function of the ascertained lead time and the reaction time of the driver.

8. The autonomous driving system as recited in claim 1, wherein in the event that the driving system determines a reaction time exceeding a predefined limit, a training message directed to the driver is sent by the driving system to the driver to increase attention of the driver.

9. An autonomous driving system for a vehicle, comprising:
    a computer unit communicatively coupled to sensors, wherein:
        the computing unit is configured to:
            evaluate surroundings-related and vehicle-related data acquired with the aid of the sensors and carry out an autonomous driving operation based on the data;
            continuously perform the following:
                determine a lead time required for an intervention by the driver by evaluating the surroundings-related and vehicle-related data;
                calculate a reaction time of the driver by evaluating driver-related data;
                compare the lead time with the reaction time and determine a comfort time by taking the difference between the lead time and the reaction time; and respond to the comparison by initiating no measures as long as the comfort time is greater than zero, and initiating a countermeasure only when the comfort time reaches zero, the countermeasure including outputting a warning to the driver; and after each outputting of the warning, carry out a calibration of the reaction time calculation, the calibration including a comparison of the reaction time calculated by the computer unit with a measured reaction time.

10. A method for operating an autonomous driving system for a vehicle, comprising:

evaluating, by a computer unit, surroundings-related and vehicle-related data acquired with the aid of sensors and carrying out an autonomous driving operation based on the data;

continuously performing the following by the computer unit:

based on the surroundings-related and vehicle-related data, determining an amount of time, prior to a point in time by which an intervention by the driver to interrupt the autonomous driving operation would be required due to a possible future event, which the autonomous driving system is expected to be able to recognize that the intervention would be required, the determined amount of time being a lead time;

based on driver-related data determining an amount of reaction time the driver is expected to take to perform the intervention in response to a signal from the autonomous driving operation; and comparing a first time value that is based on the lead time to a second time value that is based on the reaction time; and responding, by the computer unit, to a result of the comparison being that the second time value is too great relative to the first time value by, prior to the recognition that the intervention by the driver would be required, initiating a countermeasure that includes at least one of:

prewarning the driver to increase attentiveness in order to reduce the reaction time; and increasing the lead time by one of (a) changing a mode of the driving system and (b) reducing the vehicle speed.

* * * * *